No. 861,189. PATENTED JULY 23, 1907.
J. J. KOGER.
APPARATUS FOR THRESHING COW PEAS.
APPLICATION FILED MAR. 7, 1907.
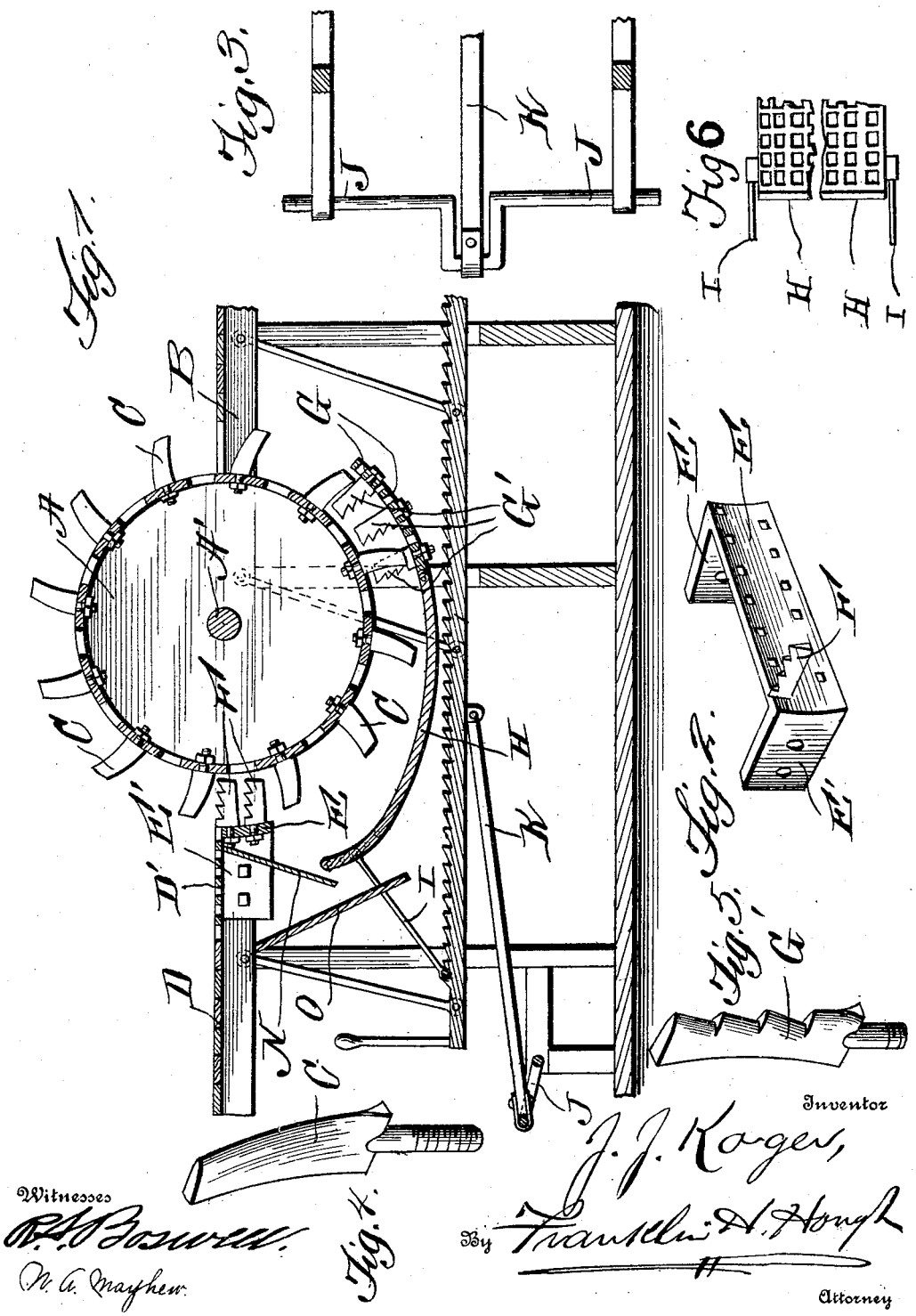

UNITED STATES PATENT OFFICE.

JOHN J. KOGER, OF ROGERSVILLE, TENNESSEE.

APPARATUS FOR THRESHING COW-PEAS.

No. 861,189.  Specification of Letters Patent.  Patented July 23, 1907.

Application filed March 7, 1907. Serial No. 361,073.

*To all whom it may concern:*

Be it known that I, JOHN J. KOGER, a citizen of the United States, residing at Rogersville, in the county of Hawkins and State of Tennessee, have invented certain new and useful Improvements in Apparatus for Threshing Cow-Peas; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in apparatus for threshing and separating the Southern cow peas from the vines just as they come from the mowing machine.

Statistics show that fully ninety-five per cent of all the Southern cow peas for seed in the United States are picked from the field by hand. The covering of the cow pea that holds the two halves together with its life germ, is of such a delicate nature that the friction and compaction attending every process of threshing in the vines, have resulted in utter failure. The tough and fibrous vines of the Southern cow pea figure almost as much in the defeat for practical results as the pea itself. They must be cut before they can be threshed. The peculiar organization of the pods also are such that if they are cut in two or more pieces, the peas in these cut pods are liberated completely, and are now ready for separating, the quickest and surest way out, are features that should be considered, thus avoiding the further possibility of breakage. Herein is one of the novelties and efficiency of my invention manifested. The pods and vines are easily slit and thoroughly cut by this combination with a reduction of friction and compaction to the smallest degree, thus giving a machine that will do a perfect work, never done before—threshing and separating the Southern cow peas from the vines, just as they come from the mowing machine and not breaking more than one or two per cent.

My invention consists in various details of construction and combinations and arrangements of parts which will be hereinafter fully described and then specifically defined in the appended claims.

I illustrate my invention in the accompanying drawings, in which:—

Figure 1 is a vertical sectional view through my invention, Fig. 2 is an enlarged detail view of one of the concaves. Fig. 3 is a detailed view of the shaker rod and Figs. 4 and 5 are detailed perspective views of the cutting blades. Fig. 6 is a detail top plan view of one of the separating grates.

Reference now being had to the details of the drawings by letter, A designates a cutter head mounted upon a shaft A' journaled in suitable bearings upon the frame B. Fixed to the circumference of the cutter head is a series of cutting blades C which are arranged in spiral rows about the circumference of the cylinder, with their forward cutting edges slightly convexed.

D designates a feeding table having a separating grate D' continuous therewith, and E designates a concave having wings E' securely held to the frame by means of bolts or other suitable fastening means.

F, F designate series of stepped cutting blades which are held by means of nuts to the concave E and in horizontal positions with the blades thereon projecting from their upper edges and between which blades F, the blades C of the cutter head are adapted to turn. It will be noted that the upper serrated edges of the blades F are preferably in alinement with the surface of the table D.

G designates a second concave having three rows of serrated blades G' which are set at inclinations and in rows below and posterior to the cutter head and between which blades G, the blades C of the cutter head are adapted to turn.

H designates a separating grate and feeding device which is situated immediately under the cutter head and between and underneath the two concaves. Said grate H is hinged securely to the forward end of the concave G and a pitman I is fastened to its other end, whereby the length of the shake may be regulated by moving the connection of the pitman to engage one or another of the apertures in the free end of said grate. Said pitmen, (there being one upon each side of the separating grate,) have their lower ends attached to the grain table, and are moved by the latter as it swings to and fro below. A pitman K is fastened to the grain table and is adjustably held to the shaker rod J, as shown clearly in Fig. 1 of the drawings.

Mounted underneath the grate D' is an apron N provided for the purpose of directing any of the loose peas which may pass through the grate against a second apron O, whereby the peas may be deposited upon the grain table.

In operation, the cow peas attached to the vines are placed upon the feed table and passing over the separating grate, they come in contact with the cutting blades upon the cylinder or cutter head. The pods and the pea vines are slit and thoroughly cut, thus liberating most all of the peas from the pods, after which the vines are forced down on the separating grate H which allows the liberated peas to readily pass through said grate H to the grain table below. The straw upon the separating grate has ample room and time to leave for the moment the cutting blades on the cutter head and assume a new position, as well as allowing the peas that are separated to pass upon the grain table, and the further shaking of the separating grate and feeding device will push up the vines and prepare the same to be caught by the blades upon the rotary cutter head or cylinder for the second operation of the combined blades of the cutter head, and the deeply notched blades which are stationary, which operation is an important feature of the present invention not contemplated in any other operation now in use for threshing cow peas, the effect of this operation of the apparatus being the equivalent of passing the peas through two machines. By reason of the separating grate H being hinged to the front end of the concave G and its other end to the pitmen, it will be noted that the length of the shake may be regulated by moving the connection of the pitmen to engage one or the other of the holes in the free end of said grate. By the provision of the combination of thin blades having deep serrations, preferably three, a much larger quantity of cow peas may be successfully threshed without injury thereto, than with the form of apparatus commonly used.

What I claim is:—

1. An apparatus for threshing cow peas comprising a rotatable cutter cylinder with blades thereon, combined with series of stationary concaves having deeply notched teeth upon the cutting edges thereof, a separating grate and feeding device hinged to one of said concaves, means for adjusting said separating grate and feeding device, a grain table, a shaker rod connected thereto, and connections between said table and separating grate and feeding device, as set forth.

2. An apparatus for threshing cow peas comprising a rotatable cutter cylinder with blades thereon, combined with series of stationary concaves having deeply notched teeth upon the cutting edges thereof, a separating grate and feeding device hinged to one of said concaves, pitmen adjustably held to its free end, and a grain table having serrations thereon and to which said pitmen are connected, as set forth.

3. An apparatus for threshing cow peas comprising a rotatable cutter cylinder with blades thereon, combined with series of stationary concaves having deeply notched teeth upon the cutting edges thereof, a separating grate and feeding device hinged to one of said concaves, pitmen adjustably held to its free end, a grain table having serrations thereon and to which said pitman is connected, a horizontally disposed feed table and separating grate adjacent to one of the concaves, and aprons underneath said horizontally disposed separating grate and adjacent to the free end of the hinged grate, as set forth.

4. An apparatus for threshing cow peas comprising a rotatable cutter cylinder with blades thereon, a horizontally disposed feed table and separating grate, a concave having horizontally projecting wings fastened underneath said grate, blades projecting horizontally from said concave and having serrations upon the upper edges thereof, a second concave arranged below and posterior to the cutter head, cutting blades having their forward edges serrated and mounted upon said second concave, a separating grate and feeding device hinged to said second concave, a grain table, and pitmen connected thereto and adjustably connected to said feeding device, as set forth.

5. An apparatus for threshing cow peas comprising a rotatable cutter cylinder with blades thereon, a horizontally disposed feed table and separating grate, a concave having horizontally projecting wings fastened underneath said grate, blades projecting horizontally from said concave and having serrations upon the upper edges thereof, a second concave arranged below and posterior to the cutter head, cutting blades having their forward edges serrated and mounted upon said second concave, a concaved separating grate and feeding device hinged to said second concave and having apertures in its free end, a grain table, a shaker rod and pitman connections therewith, and a pitman adjustably held to the apertured end of said feeding device and also connected to the grain table, as set forth.

In testimony whereof I hereunto affix my signature in the presence of two witnesses.

JOHN J. KOGER.

Witnesses:
M. V. KOGER,
E. F. KOGER.